US011875203B2

(12) United States Patent
Kim (10) Patent No.: US 11,875,203 B2
(45) Date of Patent: Jan. 16, 2024

(54) WIRELESS COMMUNICATION CARD, AND METHOD OF MANUFACTURING THE SAME

(71) Applicant: KONA M CO., LTD., Jincheon-gun (KR)

(72) Inventor: Young Gyu Kim, Jincheon-gun (KR)

(73) Assignee: KONA M CO., LTD., Jincheon-gun (KR)

( * ) Notice: Subject to any disclaimer, the term of this patent is extended or adjusted under 35 U.S.C. 154(b) by 0 days.

(21) Appl. No.: 17/811,569

(22) Filed: Jul. 8, 2022

(65) Prior Publication Data

US 2023/0027761 A1    Jan. 26, 2023

(30) Foreign Application Priority Data

Jul. 9, 2021    (KR) .................. 10-2021-0090087

(51) Int. Cl.
G06K 1/12        (2006.01)
G06K 19/077      (2006.01)

(52) U.S. Cl.
CPC ......... *G06K 1/12* (2013.01); *G06K 19/07749* (2013.01)

(58) Field of Classification Search
CPC ....................................................... G06K 1/12
See application file for complete search history.

(56) References Cited

U.S. PATENT DOCUMENTS

2018/0339503 A1*  11/2018  Finn ..................... H01Q 1/2225

FOREIGN PATENT DOCUMENTS

| JP | 11-134455 A | 5/1999 |
|---|---|---|
| JP | 2004-17537 A | 1/2004 |
| JP | 2019-220139 A | 12/2019 |
| KR | 10-2017-0120524 A | 10/2017 |
| KR | 10-1902207 B1 | 11/2018 |

OTHER PUBLICATIONS

Non-Final Office Action for KR 10-2021-0090087 by Korean Intellectual Property Office dated Sep. 23, 2021.
Office Action for JP 2022-109640 by Japan Patent Office dated Aug. 1, 2023.

* cited by examiner

*Primary Examiner* — Rafferty D Kelly
(74) *Attorney, Agent, or Firm* — BROADVIEW IP LAW, PC

(57) ABSTRACT

In a wireless communication card and a manufacturing method thereof according to an embodiment of the present invention, the method comprises the steps of: processing an antenna inlay layer including an antenna coil; stacking a first overlay layer that covers a top surface of the antenna inlay layer; processing a PVC insert inserted in a chip-on-board (COB) accommodation space, which is formed by milling a specific area of the first overlay layer, and provided with an accommodation groove in which a lower portion of a pad of the COB is supported; passing both ends of the antenna coil drawn out from the antenna inlay layer through the PVC insert, and connecting the antenna coil to contact areas of the COB; and mounting the COB in the PVC insert inserted in the COB accommodation space.

17 Claims, 8 Drawing Sheets

WIRELESS COMMUNICATION CARD, AND METHOD OF MANUFACTURING THE SAME

CROSS-REFERENCE TO RELATED APPLICATION

This application claims priority under 35 U.S.C. § 119 to Korean Patent Application No. 10-2021-0090087 filed in the Korean Intellectual Property Office on Jul. 9, 2021, the entire contents of which are hereby incorporated by reference.

FIELD OF THE INVENTION

The present invention relates to a wireless communication card and a method of manufacturing the same.

BACKGROUND OF THE RELATED ART

Generally, credit cards may be used in place of cash, and are developed recently as contact or contactless smart cards embedded with IC chip modules that can store large amounts of information so as to be actively used as various membership cards, as well as for payment. Special cards using various materials are developed in the market of smart cards. Particularly, differentiated credit cards of metal material are developed for VIP customers, and the metal cards realize high-dignity credit cards with metallic luster and are provided to special customers.

However, due to the characteristics of metal, the antenna of a card using metal may abnormally operate during wireless (contactless) communication with a reader, and restrictions on RF functions, using ATMs, and the like may occur. In addition, a method of manufacturing a card using a thin metal sheet or by thinly coating metal powder makes it difficult to form patterns and characters on the surface of a metal card, and when the cards are formed of a material that is too light, there is also a problem in that the sense of weight that the metal has cannot be felt. Therefore, it is required to develop metal cards capable of overcoming the limitations of the metal cards and expressing the feeling of weight and aesthetics peculiar to the metal.

Accordingly, cards of a metal material using connection of a metal sheet of an SUS material and an antenna are developed recently to solve the problem. To this end, studies on the configurations that may guarantee normal information storage and process of a wireless communication card by blocking electrical interference between the antenna coil and the metal material and methods capable of improving productivity by increasing efficiency of the manufacturing process are under progress.

SUMMARY OF THE INVENTION

The present invention has been made in view of the above-mentioned problems occurring in the prior art, and it is an object of the present invention to provide a wireless communication card and a method of manufacturing the same, which can store and process information by blocking electrical interference and making the manufacturing process efficient through a process using an IC chip and a plastic workpiece inserted in a metal sheet.

To accomplish the above object, according to an aspect of the present invention, there is provided a method of manufacturing a wireless communication card, the method comprising the steps of: processing an antenna inlay layer including an antenna coil; stacking a first overlay layer that covers the top surface of the antenna inlay layer; processing a PVC insert inserted in a chip-on-board (COB) accommodation space, which is formed by milling a specific area of the first overlay layer, and provided with an accommodation groove in which a lower portion of a pad of the COB is supported; passing both ends of the antenna coil drawn out from the antenna inlay layer through the PVC insert, and connecting the antenna coil to contact areas of the COB; and mounting the COB in the PVC insert inserted in the COB accommodation space.

In addition to accomplish the above object, according to another aspect of the present invention, there is provided a wireless communication card comprising: an antenna inlay layer including an antenna coil; a first overlay layer that covers the top surface of the antenna inlay layer; and a second overlay layer that covers the bottom surface of the antenna inlay layer, and the wireless communication card is provided with a PVC insert primarily inserted in a Chip-On-Board (COB) accommodation space provided in a specific area of the first overlay layer, and includes an accommodation groove that supports a COB pad and accommodates a protrusion provided on the bottom surface of the COB pad.

DETAILED DESCRIPTION OF THE PREFERRED EMBODIMENT

The following descriptions merely illustrate the principle of the present invention. Therefore, those skilled in the art may invent various devices, although not explicitly described or shown in this specification, which implement the principle of the present invention and are included within the spirit and scope of the present invention. Moreover, it should be understood that all conditional terms and embodiments listed in this specification are, in principle, clearly intended only for the purpose of making the concept of the present invention understood, and not limited to the specially listed embodiments and states as described.

For example, throughout the specification, when a part is "connected" to another part, it includes a case of "indirectly connected" to another part with a part interposed therebetween, as well as a case of "directly connected". In addition, when a part "includes" a certain component, this means that the component may be further provided, rather than excluding the component, unless specially stated otherwise.

In addition, it should be understood that all detailed descriptions listing specific embodiments, as well as the principles, viewpoints, and embodiments of the present invention, are intended to include structural and functional equivalents of such matters. In addition, it should also be understood that such equivalents include not only currently known equivalents, but also equivalents that will be developed in the future, i.e., all devices invented to perform the same function regardless of the structure.

The objects, features and advantages described above will become more apparent through the detailed description described below in relation to the accompanying drawings, and accordingly, those skilled in the art may easily implement the technical spirit of the present invention. In addition, when it is determined in the description of the present invention that a detailed description of a known technology related to the present invention may unnecessarily obscure the gist of the present invention, the detailed description will be omitted.

The terms used in this application are only used to describe specific embodiments, and are not intended to limit the present invention. The singular expressions include plural expressions unless the context clearly implies otherwise. It should be understood that in this application, terms such as "comprise" or "have" are intended to specify presence of a feature, number, step, operation, component, part, or a combination thereof described in the specification, not to preclude presence or possibility of addition of one or more other features, numbers, steps, operations, components, parts, or combinations thereof.

Hereinafter, preferred embodiments of the present invention will be described in more detail with reference to the accompanying drawings. In describing the present invention, in order to make the overall understanding easy, the same reference numerals are used for the same components in the drawings, and duplicate descriptions of the same components are omitted.

Figure 1:
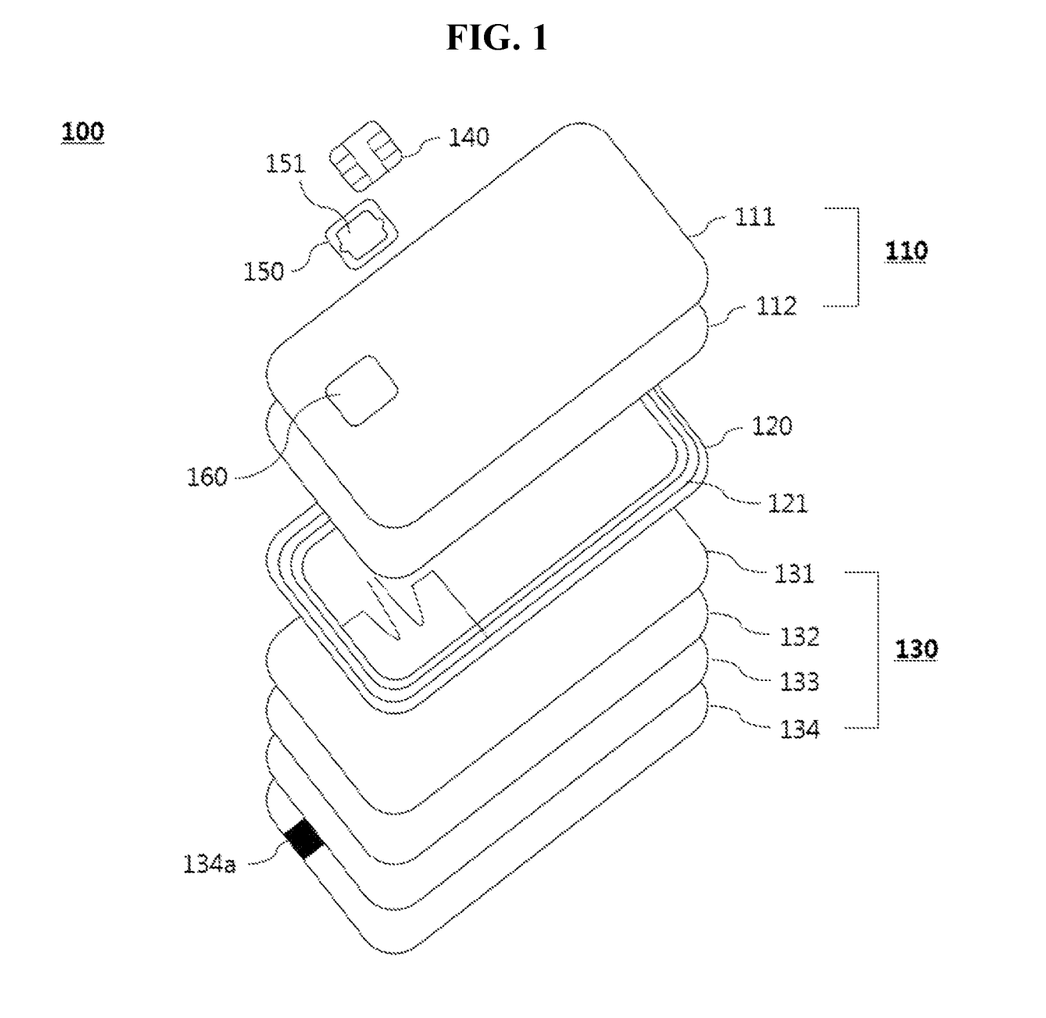
FIG. 1 is a perspective view showing a wireless communication card according to an embodiment of the present invention.

FIG. 1 is a perspective view showing a wireless communication card 100 according to an embodiment of the present invention.

Referring to FIG. 1, a wireless communication card 100 according to an embodiment of the present invention may include one or more sheets or layers.

The wireless communication card 100 according to an embodiment of the present invention may include a first overlay layer 110, an antenna inlay layer 120, and a second overlay layer 130.

The wireless communication card 100 may be formed by stacking the first overlay layer 110 that covers the top surface of the antenna inlay layer 120 including an antenna coil, and the second overlay layer 130 that covers the bottom surface of the antenna inlay layer 120.

Specifically, the first overlay layer may include a metal layer 111 and an insulating layer 112. The second overlay layer may include an epoxy layer 131, a printed layer 132, an antibacterial layer 133, and a magnetic stripe overlay layer (MS O/L) 134.

At this point, a COB 140 that provides a contact or contactless communication and transaction function may be inserted in a COB accommodation space 160 milled as much as a depth that penetrates the first overlay layer 110 and exposes the antenna coil 121 of the antenna inlay layer 120. Therefore, the wireless communication card 100 may be a card that can process credit payment, debit card payment, and post-paid payment based on the COB 140 that can store and process information in a contact or contactless manner according to the function of a card issued by a card company or an operation system of a card reader or the like.

In this figure, it is not limited to the components described above, and other components for implementing additional functions or design aesthetics of the wireless communication card 100 may be further added, and a display unit, a biometric sensor unit, and the like may be additionally included for the additional functions.

In addition, the wireless communication card 100 of the present invention may be manufactured to fit the standard size and thickness according to a predefined electronic card manufacturing standard, and the size and thickness of each sheet may be implemented to be determined and combined in an optimal thickness suitable for the operation of the wireless communication card 100 and related devices such as a card reader or the like.

Furthermore, the sheets (layers) constituting the wireless communication card 100 of the present invention may be configured as, rather than a sheet for making a single card, a large sheet of a size including a plurality of cards to allow mass production.

First, the metal layer 111 according to an embodiment of the present invention is a sheet that forms a layer expressing the feeling and weight of a material peculiar to metal, and may be formed of a steel use stainless (SUS) material. Alternatively, the metal layer 111 may be formed of a solid metal such as copper, copper alloy, silver, or the like having antibacterial property.

The metal material constituting the metal layer 111 may be selected by considering durability, wear, modification degree, and the like for enduring the manufacturing process, as well as the material and weight for expressing the characteristics of metal. As an embodiment, the metal layer 111 made of SUS may be a material that is resistant to corrosion and capable of being heat-treated. Heat treatment refers to an operation of heating metal at a predetermined temperature to improve the metal to have a property or metal structure of a certain purpose according to cooling speed. The metal layer 111 may have irregularities on a portion of or all the surface to increase the adhesive force. In addition, when the wireless communication card 100 is manufactured, the metal layer 111 may be processed through a heat-treatment process to improve the strength and restoring force.

As an embodiment, the metal layer 111 of the present invention may be configured as a large sheet including a plurality of cards, and after performing a laminating process of manufacturing one sheet by laminating several sheets and applying heat and pressure, several cards may be produced through a cutting process. For the cutting process of a metal sheet including a plurality of cards, a special processing material, a coolant, and a cutting tool may be used according to the characteristics of a metal material.

The insulating layer 112 performs a function of blocking interference with the metal layer 111 so that the antenna of the antenna inlay layer 120 may operate. In order for an NFC antenna to operate, communication with an antenna reader on the opposite side should be performed. In this case, a magnetic field is generated in the antenna coil 121 provided in the antenna inlay layer 120. At this point, this is a structure in which the antenna coil 121 and the metal material of the metal layer 111 are close to each other, and as the metal material changes the self-resonant frequency (SRF) of the antenna coil 121 to worsen the loss and lowered the inductance of the antenna coil 121, a communication failure is generated eventually. This phenomenon is caused by the eddy current generated in the metal due to the magnetic field, and in order to remove the eddy current, the line of magnetic force should be adjusted in both directions by positioning a material of high magnetic permeability and high resistance between the metal and the antenna. The insulating layer 112 is used for this purpose, and this is also referred to as a ferrite sheet. Ferrite may be used by making iron powder, oxidizing the outer surface to be insulated, and applying pressure to make a shape. The metal layer 111 and the insulating layer 112 may be adhered using a hot melt adhesive. A film-type hot melt adhesive may be used as the hot melt adhesive, considering the characteristic of being melted by heat and solidified when it cools down.

The antenna inlay layer 120 may be a sheet including a radio frequency (RF) antenna coil 121, and the number of turns of the antenna coil 121 may be determined to exhibit optimized sensitivity through sensitivity test of RF communication (e.g., NFC, RFID). In addition, through an accommodation groove 151, the antenna coil 121 of the present invention may be implemented to be directly connected to the contact areas 143 and 144 of the COB provided on the bottom surface of the IC chip 140 of the COB (Chip-On-Board) attached to the first overlay layer 110.

The printed layer 132 is a sheet for printing and displaying information about the card or an image such as information, pattern, or logo of the card, and may be attached on the bottom surface of the epoxy layer 131.

In addition, the antibacterial layer 133 may be configured as a sheet processed by coating or adding a material that provides an antibacterial function.

Finally, the magnetic strip overlay layer 134 may be a sheet including a magnetic strip 134a.

The antibacterial layer 133 may be coated or added with a material that provides an antibacterial function to the magnetic strip overlay layer 134 itself so that the magnetic strip region may be exposed to the outside.

Figure 2:
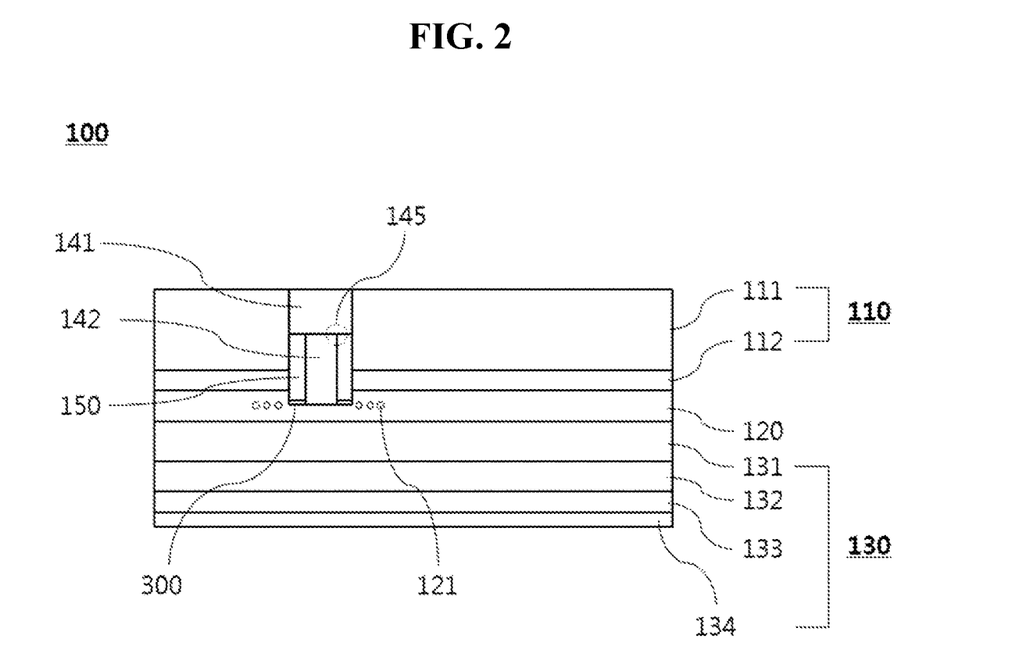
FIG. 2 is a cross-sectional view showing a wireless communication card according to an embodiment of the present invention.
Figure 3A:
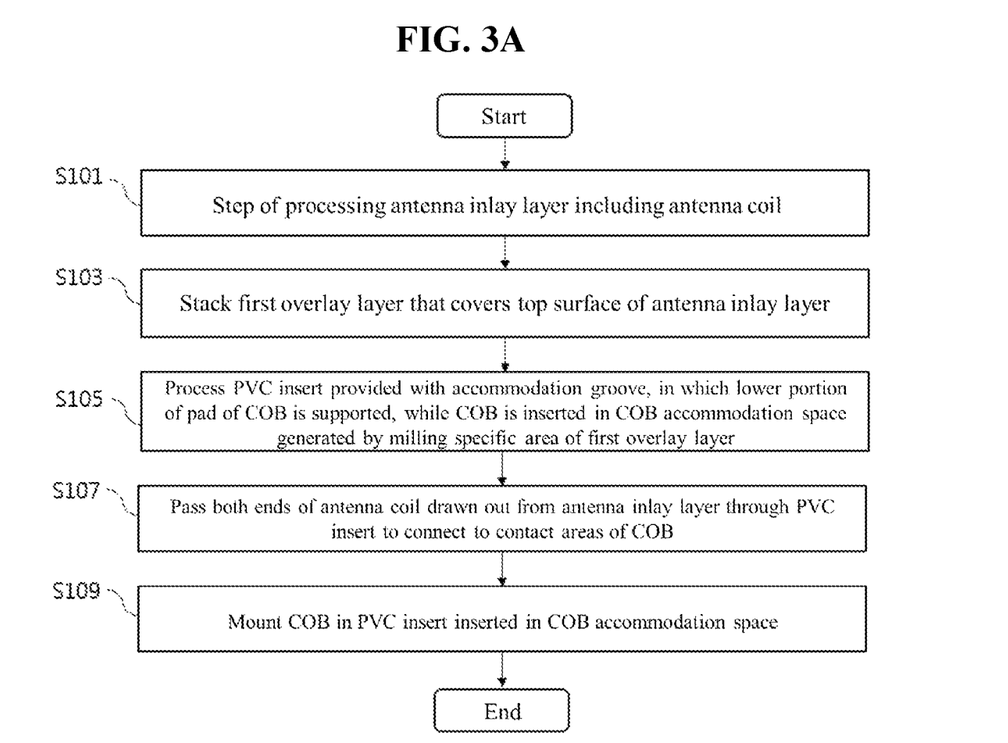
FIGS. 3A, 3B, 3C and 3D are flowcharts illustrating methods of manufacturing a wireless communication card according to embodiments of the present invention.
Figure 3B:
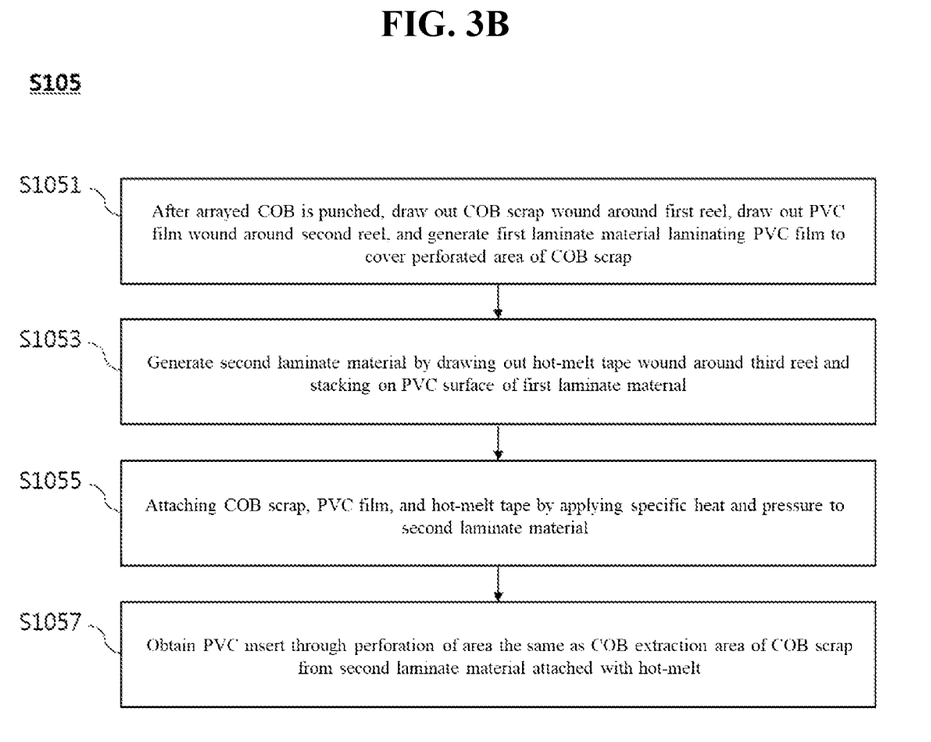
Figure 3C:
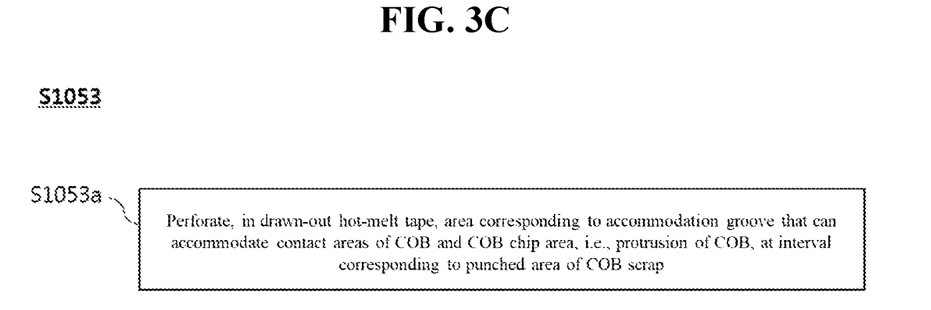
Figure 3D:
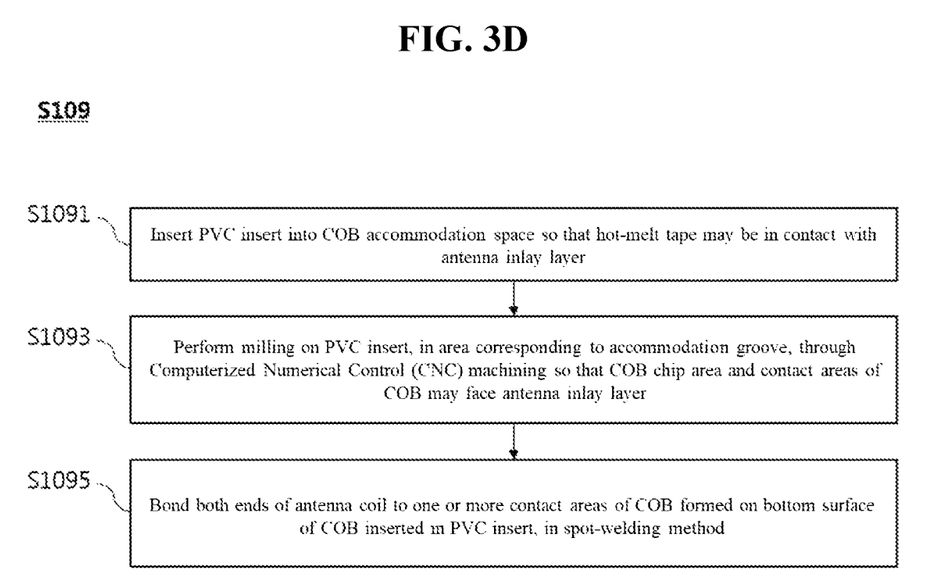

FIG. 2 is a cross-sectional view showing a wireless communication card 100 according to an embodiment of the present invention.

Referring to FIG. 2, the wireless communication card 100 according to an embodiment of the present invention may be formed in a shape of stacking, in order from the top, a first overlay layer 110 including a metal layer 111 and an insulating layer 112, an antenna inlay layer 120, and a second overlay layer 130 including an epoxy layer 131, a printed layer 132, an antibacterial layer 133, and a magnetic strip overlay layer 134.

The stacked sheets of the metal layer 111, the insulating layer 112, the antenna inlay layer 120, the epoxy layer 131, the printed layer 132, the antibacterial layer 133, and the magnetic strip overlay layer 134 may be attached according to a conventional laminating method.

As a preferred thickness of each layer according to an embodiment of the present invention, the metal layer 111 may be formed in a thickness of 0.30 mm, the insulating layer 112 in a thickness of 0.06 mm, the antenna inlay layer 120 in a thickness of 0.13 mm, the epoxy layer 131 in a thickness of 0.15 mm, the printed layer 132 in a thickness of 0.10 mm, and the antibacterial layer 133 in a thickness of 0.06 mm.

In addition, the wireless communication card 100 may include a Chip-On-Board (COB) 140. The COB 140 may be divided into a COB chip 142 coupled to protrude from a COB pad 141 into the antenna inlay layer 120, and contact areas 143 and 144 of the COB to which both ends of the antenna coil 121 are connected. In addition, the COB 140 may include a step unit 145 formed by coupling of the COB pad 141 and the COB chip 142.

Additionally, the wireless communication card 100 may include, in a specific area of the first overlay layer 110, a COB accommodation space 160 milled as much as a depth that penetrates in an area corresponding to the COB pad 141 and exposes the antenna coil 121 of the antenna inlay layer 120. The COB 140 may be inserted in the COB accommodation space 160 so that the bottom surface of the COB chip 142 may face the exposed surface of the antenna inlay layer 120.

In addition, the wireless communication card 100 may include a PVC insert 150 primarily inserted in the COB accommodation space 160. The PVC insert 150 supports the step unit 145 formed by the COB pad 141 and the COB chip 142, and may include an accommodation groove 151 so that a protrusion of the COB chip 142 formed on the bottom of the COB pad 141 may pass through and face the antenna inlay layer 120.

The PVC insert 150 may have a thickness as much as the COB 140 does not protrude to the outside when the COB 140 is inserted in the COB accommodation space 160. As for the thickness of the PVC insert 150, preferably, the PVC insert 150 may be made of a PVC film having a thickness in a range of 0.1 to 0.3 mm.

In addition, the PVC insert 150 is provided with a hot-melt tape 300 on the bottom surface to be attached to the antenna inlay layer 120. The PVC insert 150 may be processed to have an area the same as the top surface area of the COB 140 exposed to the outside.

The accommodation groove 151 may be perforated so that the COB chip 142 area, i.e., a protrusion of the COB 140, and the contact areas 143 and 144 of the COB, to which both ends of the antenna of the antenna coil 121 are connected, may face the antenna inlay layer 120. The accommodation groove 151 may be milled as much as a depth corresponding to the antenna inlay layer 120 where the antenna coil is exposed, through Computerized Numerical Control (CNC) machining.

FIG. 3 is a flowchart illustrating a method of manufacturing a wireless communication card 100 according to an embodiment of the present invention.

Referring to FIG. 3, in the method of manufacturing the wireless communication card 100, first, the step of processing the antenna inlay layer (S101) is performed.

The antenna inlay layer 120 may be processed as a sheet including the antenna coil 121, of which the number of turns is determined to exhibit optimized sensitivity through sensitivity test of RF communication (e.g., NFC, RFID).

Then, the step of stacking the first overlay layer (S103) is performed.

The first overlay layer 110 that covers the top surface of the antenna inlay layer 120 may be stacked to cover the top surface of the antenna inlay layer 120. The step of stacking the first overlay layer (S103) may include a step of stacking the insulating layer 112 on the antenna inlay layer 120 (not shown). The step of stacking the first overlay layer (S103) may further include a step of stacking a heat-treated SUS metal layer 111 on the insulating layer 112 (not shown) to improve strength and restoring force.

In addition, the step of stacking a second overlay layer (not shown) may be included. The step of stacking a second overlay layer may include a step of stacking the second overlay layer 130 that covers the bottom surface of the antenna inlay layer 120.

In addition, the step of stacking the second overlay layer may include a step of stacking the epoxy layer 131 on the bottom of the antenna inlay layer 120 (not shown). The epoxy layer 131 may minimize bending of the card and reduce marks that may be generated due to the antenna coil.

In addition, the step of stacking the second overlay layer may further include a step of stacking the printed layer 132 on the bottom of the epoxy layer 131 (not shown). The step of laminating the second overlay layer may further include a step of stacking the antibacterial layer 133 on the bottom of the printed layer 132 (not shown) using an antibacterial function material. The step of stacking the second overlay layer may further include a step of stacking the magnetic strip overlay layer 134 on the bottom of the antibacterial layer 133 (not shown).

The metal layer 111, the insulating layer 112, the antenna inlay layer 120, the epoxy layer 131, the printed layer 132, the antibacterial layer 133, and the magnetic strip overlay layer 134 may be fixed to form one body by tightly adhering the stacking surfaces according to a laminating process.

In addition, as a PVC insert processing step (S105) is performed, the PVC insert 150 provided with the accommodation groove 151, in which the lower portion of the pad of the COB 140 is supported, may be processed while the COB 140 is inserted in the COB accommodation space 160 generated by milling a specific area of the first overlay layer 110.

Specifically, as the PVC insert processing step (S105) is performed, the PVC insert 150 may be processed to include the accommodation groove 151 that is perforated to support the step unit 145 formed by the COB chip 142 provided on the bottom surface of the COB pad 141 and to connect both ends of the pulled-up antenna coil 121 to the contact areas 143 and 144 of the COB provided in a specific portion around the COB chip 142. The PVC insert 150 is preferably formed of a PVC film having a thickness of 0.1 to 0.3 mm.

Thereafter, as the step (S107) of connecting both ends of the antenna coil 121 is performed, both ends of the antenna coil 121 drawn out from the antenna inlay layer 120 may pass through the inside of the accommodation grooves 151 provided in the PVC insert 150 to be connected to the contact areas 143 and 144 of the COB, respectively.

In addition, as the step of mounting the COB 140 (S109) is performed, the COB 140 may be mounted in the PVC insert 150 inserted in the COB accommodation space 160. The COB 140 is inserted in the accommodation groove 151 provided in the PVC insert 150, and therefore, the COB chip 142 and the contact areas 143 and 144 of the COB may face the antenna inlay layer 120 without being blocked by a structure.

At this point, the hot-melt tape 300 may be stacked on the bottom surface of the PVC insert 150 to be directly attached to the antenna inlay layer 120. In addition, the protrusion of the COB chip 142 area and the contact areas 143 and 144 of the COB may be accommodated in the accommodation groove 151 to face the antenna inlay layer 120.

The COB accommodation space 160 may be configured by milling as much as a depth that penetrates the first overlay layer 110 and exposes the antenna coil 121 of the antenna inlay layer 120.

The PVC insert processing step (S105) may include a first laminating step (S1051). As the first laminating step (S1051) is performed, a first laminate material (not shown) laminating a PVC film (not shown) to cover the perforated area of a COB scrap 200 may be generated by drawing out the COB scrap 200 wound around a first reel and drawing out the PVC film wound around a second reel after the arrayed COB 140 is punched out. At this point, the COB scrap 200 may maintain the bonding force according to the applied heat and pressure as the hot-melt tape 300 is stacked in an area where the PVC film is in contact. As another embodiment, the COB scrap 200 may be bonded when the PVC film is stacked by applying a previously molten hot melt adhesive to the area where the PVC film is in contact.

In addition, the PVC insert processing step (S105) may further include a second laminating step (S1053). The second laminating step (S1053) may include a step of generating a second laminate material (not shown) by drawing out the hot-melt tape 300 wound around a third reel and stacking on the PVC surface of the first laminate material, with respect to the first laminate material.

In addition, the PVC insert processing step (S105) may further include an attachment step (S1055). The attachment step (S1055) may include a step of attaching the COB scrap 200, the PVC film, and the hot-melt tape 300 by applying specific heat and pressure to the second laminate material.

In addition, the PVC insert processing step (S105) may further include a step of obtaining the PVC insert 150 (S1057). The step of obtaining the PVC insert 150 (S1057) may include a step of obtaining the PVC insert 150 from the second laminate material obtained at the attachment step, by perforating an area the same as the COB extraction area of the COB scrap 200 (S1055).

In addition, the second laminating step (S1053) may further include a hot melt accommodation groove generation step (S1053*a*). The hot melt accommodation groove generation step (S1053*a*) may include a step of perforating, in the drawn-out hot-melt tape 300, an area corresponding to the accommodation groove 151 that may accommodate the contact areas 143 and 144 of the COB and the COB chip 142 area, i.e., a protrusion of the COB 140, at an interval corresponding to the punched area of the COB scrap 200.

In addition, the step of mounting the COB 140 (S109) may further include a step of inserting the PVC insert 150 in the COB accommodation space 160 (S1091). At the inserting step (S1091), the PVC insert 150 may be inserted in the COB accommodation space 160 so that the hot-melt tape 300 may be in contact with the antenna inlay layer 120.

In addition, the step of mounting the COB 140 (S109) may further include a milling step (S1093). The milling step (S1093) may perforate an area corresponding to the accommodation groove 151 by milling the PVC insert 150 as much as a depth corresponding to the antenna inlay layer 120 through Computerized Numerical Control (CNC) machining so that the COB chip 142 area, i.e., a protrusion of the COB 140, and the contact areas 143 and 144 of the COB, to which both ends of the antenna coil 121 are connected, may face the antenna inlay layer 120.

In addition, the step of mounting the COB 140 (S109) may further include a step of bonding the antenna coil 121 (S1095). The bonding step (S1095) may bond both ends of the antenna coil 121 to one or more of the contact areas 143 and 144 of the COB formed on the bottom surface of the COB 140 inserted in the PVC insert 150, in a spot-welding method. Although various methods may be used as the bonding method, the spot-welding method may be preferably applied.

The wireless communication card 100 manufactured through the process described above may block electrical interference, and improve productivity through efficiency of the process.

FIGS. 4 to 7 are cross-sectional views showing major processes according to a method of manufacturing a wireless communication card according to an embodiment of the present invention.

Figure 4:
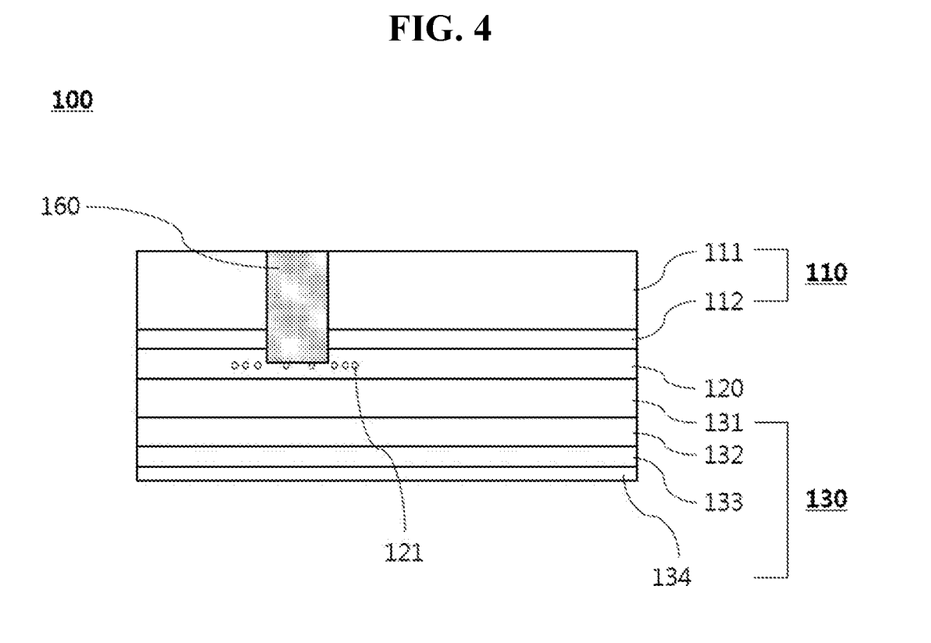
FIGS. 4 to 7 are cross-sectional views showing major processes according to a method of manufacturing a wireless communication card according to an embodiment of the present invention.

Referring to FIG. 4, the wireless communication card 100 may include a COB accommodation space 160 through milling using Computerized Numerical Control (CNC) machining after the sheets are stacked and attached. The COB accommodation space 160 may be formed by milling as much as a depth that penetrates the first overlay layer 110 and exposes the antenna coil 121 of the antenna inlay layer 120.

Figure 5:
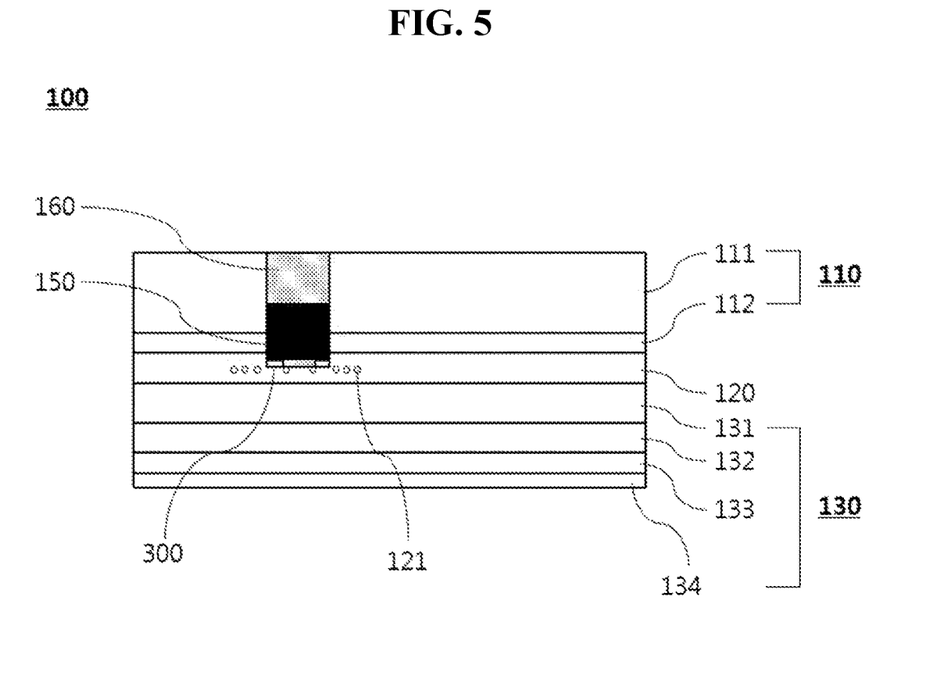

Referring to FIG. 5, the PVC insert 150 may be primarily inserted in the COB accommodation space 160 provided in the wireless communication card 100. The PVC insert 150 may maintain the bonding force with the antenna inlay layer 120 through the hot-melt tape 300 attached on the bottom surface.

Figure 6:
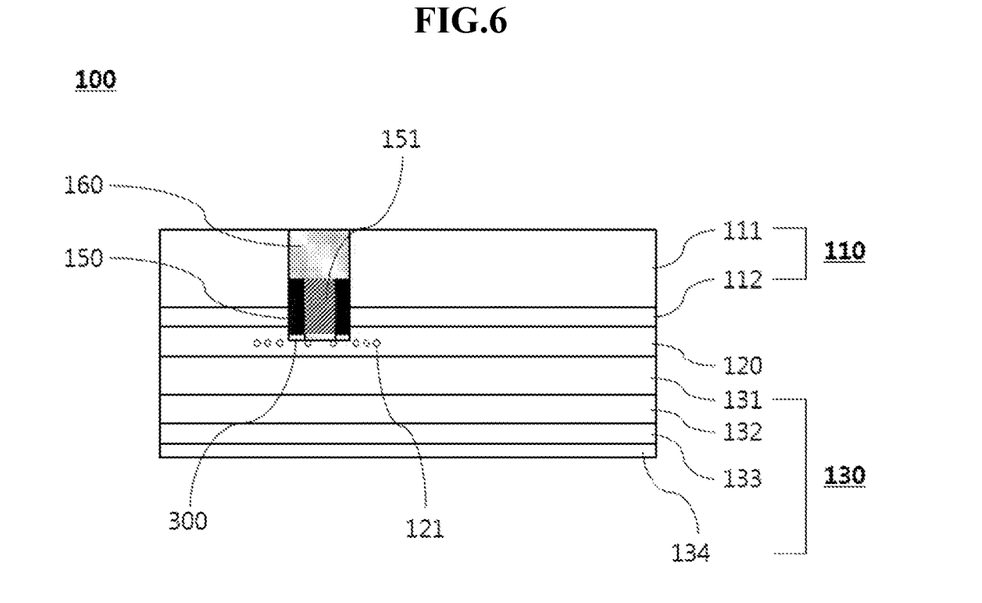

Referring to FIG. 6, the wireless communication card 100 may be provided with an accommodation groove 151 in the PVC insert 150 inserted in the COB accommodation space 160 through milling using Computerized Numerical Control (CNC) machining. The accommodation groove 151 may be perforated so that the COB chip 142 area, i.e., a protrusion of the COB 140, and the contact areas 143 and 144 of the COB, to which both ends of the antenna are connected, may face the antenna inlay layer 120.

Figure 7:
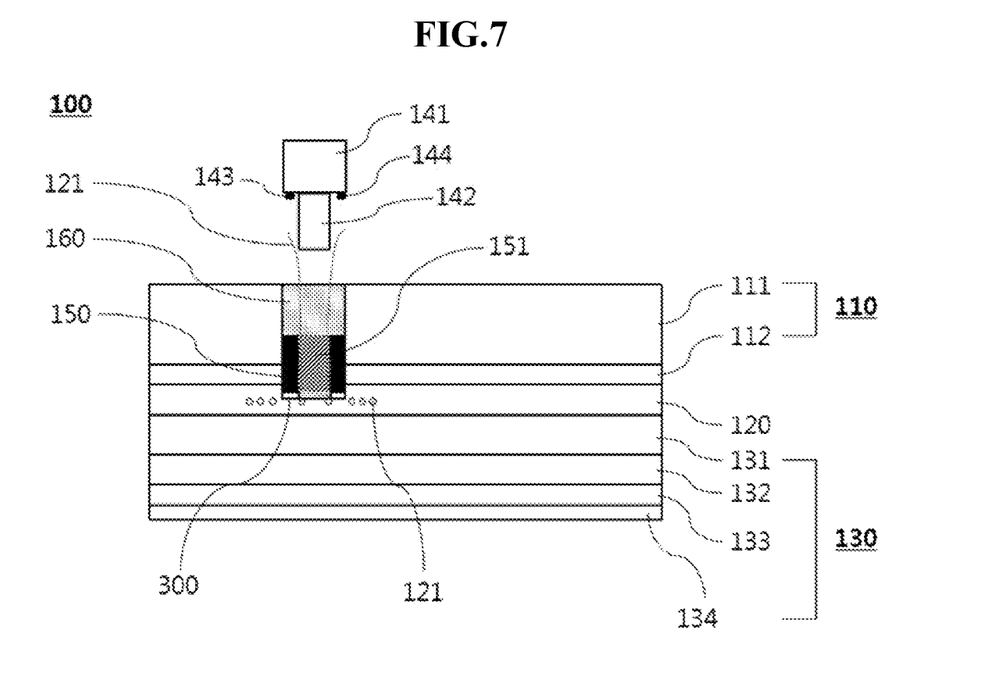

Referring to FIG. 7, the wireless communication card 100 may bond the contact areas 143 and 144 of the COB provided on the bottom of the COB 140 and both ends of the antenna coil 121, respectively. Then, the COB 140 may be inserted in the COB accommodation space 160 by being inserted in the accommodation groove 151 provided in the PVC insert 150.

Figure 8:
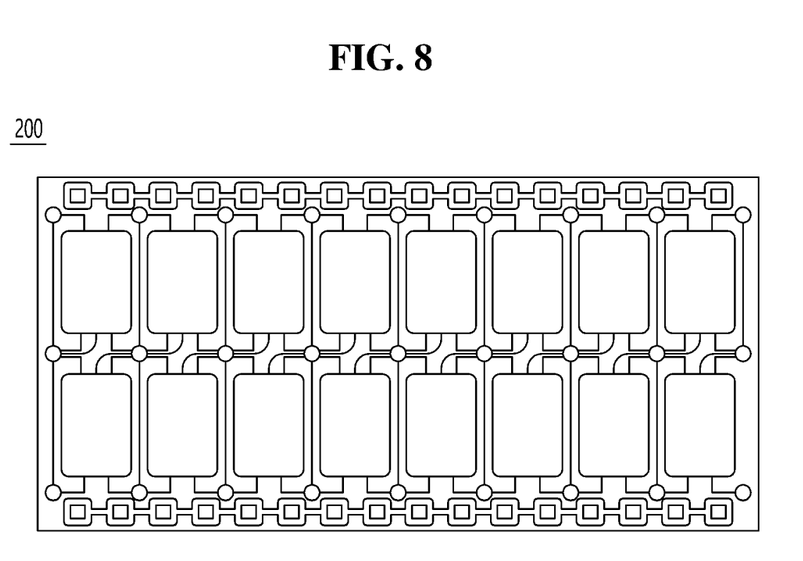
FIGS. 8 and 9 are exemplary views for explaining an apparatus and components used in a method of manufacturing a wireless communication card according to an embodiment of the present invention.
Figure 9:
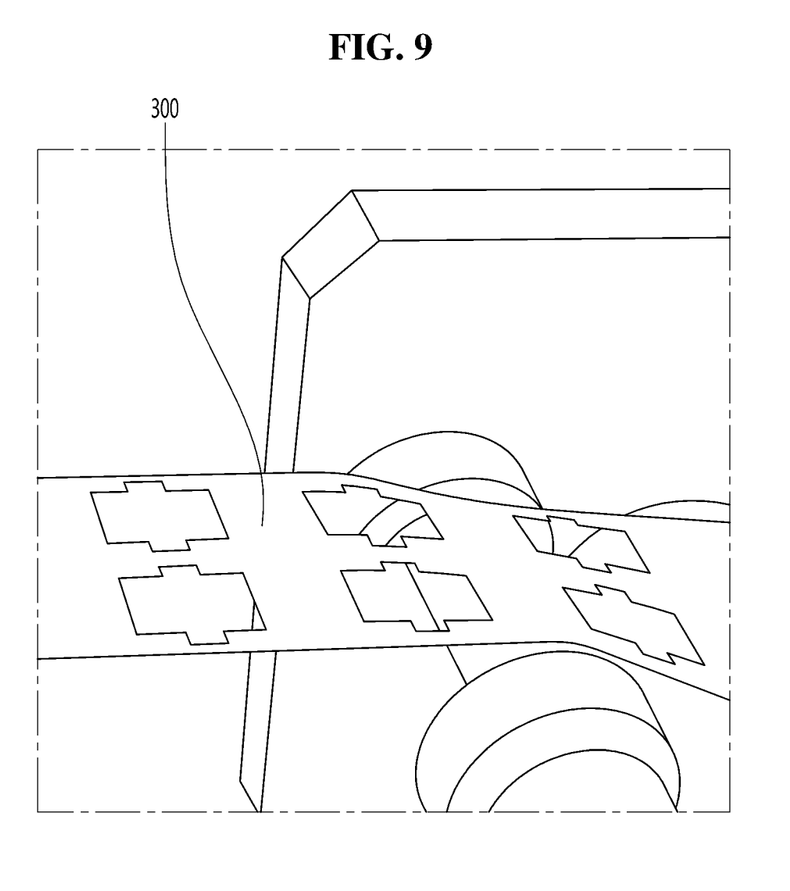

FIGS. 8 and 9 are exemplary views for explaining an apparatus and components used in a method of manufacturing a wireless communication card according to an embodiment of the present invention.

Referring to FIG. 8, the wireless communication card 100 may use the COB scrap 200 as a frame for manufacturing the PVC insert 150. The COB scrap 200 is a surplus sub-body remaining after a plurality of arrayed COBs 140 is punched, and a PVC insert 150 having an area the same as that of the COB 140 may be extracted using the same.

Referring to FIG. 9, the hot-melt tape 300 laminated so that the PVC insert 150 inserted in the wireless communication card 100 may have a bonding force to be attached to the antenna inlay layer 120 may be punched in an area the same as that of the accommodation groove 151. At this point, the hot-melt tape 300 may be perforated at intervals corresponding to the openings of the COB scrap 200. Therefore, the hot-melt tape 300 may be laminated on one side not to cover even a portion of the opening of the accommodation groove 151 of the PVC insert 150 so as to be in contact with the antenna inlay layer 120.

According to an embodiment of the present invention, there is an effect of increasing the operation efficiency of a chip. As a wireless communication card according to the present invention is implemented to directly connect the antenna coil to the COB without contacting the metal sheet, wireless communication cards that may guarantee the information storage and processing function of a normal card may be manufactured while preserving the special characteristics of a metal material. In addition, as a plastic workpiece that can block electrical interference is manufactured using a COB scrap, which remains after the COB is punched, in the manufacturing process, productivity improvement can be expected by reducing complexity of the manufacturing process and increasing the efficiency.

In addition, although preferred embodiments of the present invention have been illustrated and described above, the present invention is not limited to the specific embodiments described above, and various modifications can be made by those skilled in the art without departing from the gist of the present invention as claimed in the claims, and moreover, these modified embodiments should not be individually understood from the technical spirit or perspective of the present invention.

DESCRIPTION OF SYMBOLS

| | |
|---|---|
| 100: Wireless communication card | 110: First overlay layer |
| 111: Metal layer | 112: Insulating layer |
| 120: Antenna inlay layer | 121: Antenna coil |
| 130: Second overlay layer | 131: Epoxy layer |
| 132: Printed layer | 133: Antibacterial layer |
| 134: Magnetic strip overlay layer | 134a: Magnetic strip |
| 140: COB | 141: COB pad |
| 142: COB chip | 143: Contact area of COB |
| 144: Contact area of COB | 145: Step unit |
| 150: PVC insert | 151: Accommodation groove |
| 160: COB accommodation space | 200: COB scrap |
| 300: Hot-melt tape | |

What is claimed is:

1. A method of manufacturing a wireless communication card, the method comprising the steps of:
    processing an antenna inlay layer including an antenna coil;
    stacking a first overlay layer that covers a top surface of the antenna inlay layer;
    processing a PVC insert inserted in a chip-on-board (COB) accommodation space, which is formed by milling a specific area of the first overlay layer, and provided with an accommodation groove in which a lower portion of a pad of the COB is supported;
    passing both ends of the antenna coil drawn out from the antenna inlay layer through the PVC insert, and connecting the antenna coil to contact areas of the COB; and
    mounting the COB in the PVC insert inserted in the COB accommodation space, wherein
    the step of processing a PVC insert includes, the step of extracting the PVC insert having an area the same as that of the COB from a laminate material by laminating a COB scrap, wherein the COB scrap is obtained by winding a surplus sub-body that remains after a plurality of arrayed COBs is punched and opened by perforation in order to obtain the COB, and a PVC film wound around a second reel, and by perforating the laminated laminate material in an area the same as that of the punched opening.

2. The method according to claim 1, wherein the PVC insert is made of a PVC film having a thickness of 0.1 to 0.3 mm.

3. The method according to claim 1, wherein the step of processing a PVC insert further includes:
    a second laminating step of drawing out a hot-melt tape wound around a third reel, and generating a second laminate material by stacking the hot-melt tape on a PVC surface of the laminate material;
    an attachment step of attaching the COB scrap, the PVC film, and the hot-melt tape by applying specific heat and pressure to the second laminate material; and
    a step of obtaining the PVC insert, from the second laminate material obtained at the attachment step, by perforating an area the same as that of a COB extraction area of the COB scrap.

4. The method according to claim 3, wherein the second laminating step further includes a hot-melt accommodation groove generating step of perforating, in the drawn-out hot-melt tape, an area corresponding to the accommodation groove that may accommodate the contact areas of the COB and a chip area of the COB, i.e., a protrusion of the COB, at an interval corresponding to the punched area of the COB scrap.

5. The method according to claim 4, wherein the mounting step further includes the steps of:
inserting the PVC insert into the COB accommodation space so that the hot-melt tape may be in contact with the antenna inlay layer;
milling the PVC insert in an area corresponding to the accommodation groove through Computerized Numerical Control (CNC) machining so that the COB chip area and the contact areas of the COB may face the antenna inlay layer; and
bonding both ends of the antenna coil, in a spot-welding method, to one or more of the contact areas of the COB formed on a bottom surface of the COB inserted in the PVC insert.

6. The method according to claim 1, further comprising the step of stacking a second overlay layer that covers a bottom surface of the antenna inlay layer, wherein
the step of stacking a first overlay layer further includes the steps of:
stacking an insulating layer on the antenna inlay layer; and
stacking a metal layer of a heat-treated SUS material on the insulating layer to improve strength and restoring force, and
the step of stacking a second overlay layer further includes the steps of:
stacking an epoxy layer on a bottom of the antenna inlay layer;
stacking a printed layer on a bottom of the epoxy layer; and
stacking an antibacterial layer on a bottom of the printed layer using an antibacterial material, and
the step of laminating the metal layer, the insulating layer, the antenna inlay layer, the epoxy layer, the printed layer, and the antibacterial layer.

7. A wireless communication card comprising:
an antenna inlay layer including an antenna coil;
a first overlay layer that covers a top surface of the antenna inlay layer; and
a second overlay layer that covers a bottom surface of the antenna inlay layer, and
provided with a PVC insert primarily inserted in a Chip-On-Board (COB) accommodation space provided in a specific area of the first overlay layer, and including an accommodation groove that supports a COB pad and accommodates a protrusion provided on a bottom surface of the COB pad, wherein
the PVC insert is extracted from a laminate material to have an area the same as that of the COB by laminating a COB scrap, which is obtained by winding a surplus sub-body that remains after a plurality of arrayed COB s is punched and opened by perforation, and a PVC film wound around a second reel, and perforating the laminated laminate material in an area the same as that of the punched opening.

8. The card according to claim 7, wherein the PVC insert is made of a PVC film having a thickness of 0.1 to 0.3 mm.

9. The card according to claim 8, wherein the PVC insert is provided with a hot-melt tape on a bottom surface to be attached to the antenna inlay layer.

10. The card according to claim 7, wherein the accommodation groove is perforated through Computerized Numerical Control (CNC) machining as much as a depth corresponding to the antenna inlay layer so that a chip area of the COB and contact areas of the COB to which both ends of the antenna coil are connected may be accommodated.

11. The card according to claim 8, wherein
the first overlay layer includes: an insulating layer stacked on the antenna inlay layer; and a metal layer of a heat-treated SUS material stacked on the insulating layer to improve strength and restoring force, and
the second overlay layer includes: an epoxy layer that covers a bottom surface of the antenna inlay layer; a printed layer stacked on a bottom of the epoxy layer; and an antibacterial layer stacked on a bottom of the printed layer using an antibacterial material, and
the metal layer, the insulating layer, the antenna inlay layer, the epoxy layer, the printed layer, and the antibacterial layer are laminated.

12. A wireless communication card manufactured in a method comprising the steps of:
processing an antenna inlay layer including an antenna coil;
stacking a first overlay layer that covers a top surface of the antenna inlay layer;
processing a PVC insert inserted in a chip-on-board (COB) accommodation space, which is formed by milling a specific area of the first overlay layer, and provided with an accommodation groove in which a lower portion of a pad of the COB is supported;
passing both ends of the antenna coil drawn out from the antenna inlay layer through the PVC insert, and connecting the antenna coil to contact areas of the COB; and
mounting the COB in the PVC insert inserted in the COB accommodation space, wherein
the step of processing a PVC insert includes, the step of extracting the PVC insert having an area the same as that of the COB from a laminate material by laminating a COB scrap, wherein the COB scrap is obtained by winding a surplus sub-body that remains after a plurality of arrayed COBs is punched and opened by perforation in order to obtain the COB, and a PVC film wound around a second reel, and by perforating the laminated laminate material in an area the same as that of the punched opening.

13. The wireless communication card according to claim 12, wherein the PVC insert is made of a PVC film having a thickness of 0.1 to 0.3 mm.

14. The wireless communication card according to claim 12, wherein the step of processing a PVC insert further includes:
a second laminating step of drawing out a hot-melt tape wound around a third reel, and generating a second laminate material by stacking the hot-melt tape on a PVC surface of the laminate material;
an attachment step of attaching the COB scrap, the PVC film, and the hot-melt tape by applying specific heat and pressure to the second laminate material; and
a step of obtaining the PVC insert, from the second laminate material obtained at the attachment step, by perforating an area the same as that of a COB extraction area of the COB scrap.

15. The wireless communication card according to claim 14, wherein the second laminating step further includes a hot-melt accommodation groove generating step of perforating, in the drawn-out hot-melt tape, an area corresponding to the accommodation groove that may accommodate the contact areas of the COB and a chip area of the COB, i.e., a protrusion of the COB, at an interval corresponding to the punched area of the COB scrap.

16. The wireless communication card according to claim 15, wherein the mounting step further includes the steps of:
   inserting the PVC insert into the COB accommodation space so that the hot-melt tape may be in contact with the antenna inlay layer;
   milling the PVC insert in an area corresponding to the accommodation groove through Computerized Numerical Control (CNC) machining so that the COB chip area and the contact areas of the COB may face the antenna inlay layer; and
   bonding both ends of the antenna coil, in a spot-welding method, to one or more of the contact areas of the COB formed on a bottom surface of the COB inserted in the PVC insert.

17. The wireless communication card according to claim 12, wherein the method further comprises the step of stacking a second overlay layer that covers a bottom surface of the antenna inlay layer, wherein
   the step of stacking a first overlay layer further includes the steps of:
   stacking an insulating layer on the antenna inlay layer; and
   stacking a metal layer of a heat-treated SUS material on the insulating layer to improve strength and restoring force, and
   the step of stacking a second overlay layer further includes the steps of:
   stacking an epoxy layer on a bottom of the antenna inlay layer;
   stacking a printed layer on a bottom of the epoxy layer; and
   stacking an antibacterial layer on a bottom of the printed layer using an antibacterial material, and
   the step of laminating the metal layer, the insulating layer, the antenna inlay layer, the epoxy layer, the printed layer, and the antibacterial layer.

* * * * *